W. VON ROSENBERG, Jr.
FISHING FLOAT.
APPLICATION FILED JUNE 2, 1908.
898,784.
Patented Sept. 15, 1908.
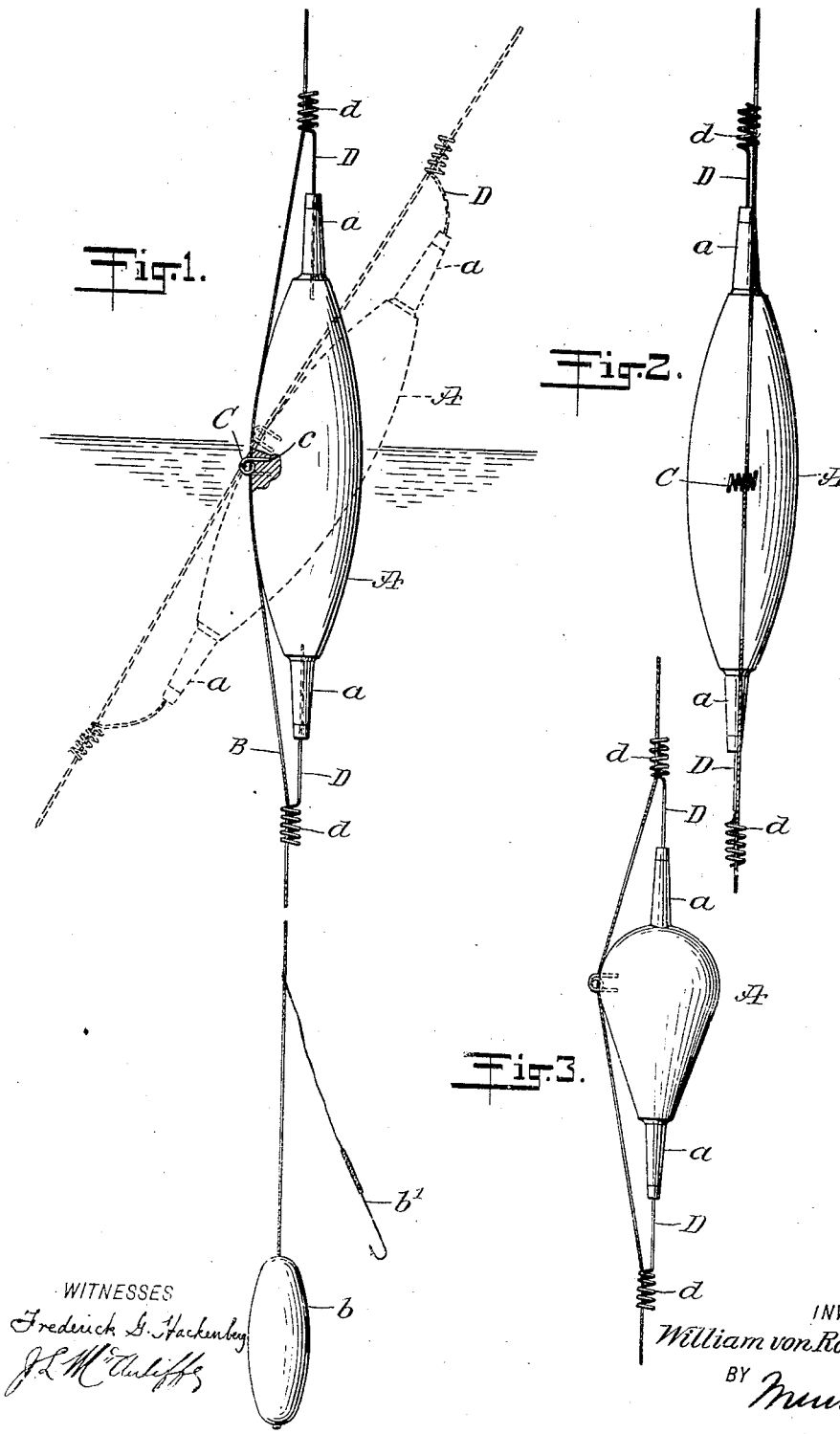
WITNESSES
Frederick G. Hackenberg
J. L. McAuliffe
INVENTOR
William von Rosenberg, Jr.
BY Munn & Co.
ATTORNEYS

UNITED STATES PATENT OFFICE.

WILLIAM VON ROSENBERG, JR., OF AUSTIN, TEXAS.

FISHING-FLOAT.

No. 898,784.  Specification of Letters Patent.  Patented Sept. 15, 1908.

Application filed June 2, 1908. Serial No. 436,260.

*To all whom it may concern:*

Be it known that I, WILLIAM VON ROSENBERG, Jr., a citizen of the United States, and a resident of Austin, in the county of Travis and State of Texas, have invented a new and Improved Fishing-Float, of which the following is a full, clear, and exact description.

My invention relates more particularly to that form of floats which is adapted to be attached to the fishing line and detached therefrom as desired, without the necessity of cutting the line or removing the hook or sinker.

My invention has for its object the construction of a float, the attachment and detachment of which may be effected with great facility; and furthermore, the invention has for its object, to improve the float, or rather its attaching means, to the end that when the line is subjected to undue strain, as for instance when the hook or sinker is snagged, that the line will not be subjected to a breaking strain at the float, in response to its tendency to assume a straight direction under the tension exerted on the line.

A further object is to insure that if the float is fouled by a tree branch, for instance, about at the surface line, the float, and its appurtenances, together with the line, will assume such positions as to enable the fisherman to free the float from the branch.

Reference is to be had to the accompanying drawings forming a part of this specification, in which similar characters of reference indicate corresponding parts in all the figures.

Figure 1 represents in elevation a fishing float, the body of which is of conventional type, the float embodying my invention in its attaching means, showing the float applied to a fishing line, the full lines in said figure indicating the normal condition of the line passing along the float, and the dotted lines in said figure indicating the float and the form the line and the end guides or attaching devices of the float tend to assume under tension due to the strain resulting from the snagging of the hook or sinker, or from the resistance offered by a large fish; Fig. 2 is an elevation taken at right angles to Fig. 1; and Fig. 3 shows an elevation, the view corresponding to the full lines in Fig. 1, but showing another well known form of float body.

Attempts have been made to construct floats with attaching means that will permit the same to be attached to the line and detached therefrom without cutting the line or removing the hook or sinker; and attaching means have also been attempted with a view to permit the attaching means to flex, to relieve the line of strain in its effort to assume a straight direction. By employing attaching devices as improved by my invention, the float can be attached and detached with great facility, and the attaching means at the ends of the float offer a minimum of resistance to the line in the tendency of the latter to assume a straight direction along the float and avoid angles in the line that might result in a breaking strain on the line at the float. Thus my improved float provides the main desiderata in a practical manner.

The buoyant body A of the float shown in Figs. 1 and 2 is of conventional type, and the line B with its sinker $b$ and hook $b'$ may be of any suitable style. On the body A of the float, at the point preferably of its greatest diameter, a friction clamp C for the line B is provided, said clamp being preferably in the form of a wire having a series of spiral convolutions, the ends $c$ of the wire being driven inward in a straight direction into the body A. Thus the line B may be entered between any of the convolutions of the clamp C, and will be snugly and yieldingly grasped between two convolutions. At each end of the body A a rigid, elongated projection $a$ is produced in any suitable manner, and to said rigid end projections $a$, I secure my improved devices D, constituting an attaching and guiding means for the line at the ends of the float. These end guides are preferably of wire, and each, for its major portion, consists of a flexible member extending from the rigid end projection of the float approximately in line with the longitudinal axis of the float, in the form of a straight, elongated strand or shank, and on the outer end of said straight strand or shank forming the major portion of the said attachment, I form a plurality of spiral coils $d$, the axis of the coils being approximately coincident to or parallel with the longitudinal axis of the float, and the coils being of a sufficient number to form substantial guides to the line in the direction of its length. With this construction, the line may be conveniently entered at the end coil $d$ of each guide D, and by an obvious manipulation, the float may be quickly attached and also very readily detached from the line.

After the line is engaged with the end guides, it is simply snapped between two convolutions of the friction clamp C, and will thus be properly held in the adjusted position. If strain is exerted on the line by resistance at the end thereof, the line may readily respond to its tendency to assume an approximately straight direction along the float, the shanks of the end guides and the coils thereof assuming the position indicated in dotted lines in Fig. 1, whereby I relieve the line of any sharp angles and breaking strains at the float, and effect this result by a construction permitting the ready attachment and detachment of the float without cutting the line.

The form of the end guides with the elongated straight shank and terminal coils, moreover is advantageous in the event the float strikes a branch or the like, in which event the fisherman can usually manipulate the tackle in a way to release the float from the snagging branch, by taking a position that will double the line back on itself and exert a pull on the end guide at the end of the float opposite to him, and cause a releasing movement of the float without undue strain on the line.

Having thus described my invention, I claim as new and desire to secure by Letters Patent,—

A fishing float, comprising a buoyant body having elongated rigid projections at each end and having its greatest diameter at a point intermediate said ends, and means for engaging the fish line in a manner to permit of the line responding to its tendency to assume an approximately straight line when put under tension by resistance, and to permit of the ready attachment and detachment of the float without cutting the line or removing the hooks or sinker, said means comprising a friction clamp on the float at about its point of greatest diameter, guides secured to the rigid end projections of the float, each of the said end guides consisting for its major portion of an elongated, flexible member projecting from the float in the form of a straight shank approximately coincident with the longitudinal axis of the float, and a plurality of spiral coils formed on the outer end of the straight shank, the coils having an axis extending in the direction of the straight flexible shank, and said shank being of a length to permit the coils to move under the strain exerted by a tension on the line to a plane about parallel with the longitudinal axis of the float and approximately in line with the friction clamp located at about the point of greatest diameter of the float.

In testimony whereof I have signed my name to this specification in the presence of two subscribing witnesses.

WILLIAM VON ROSENBERG, Jr.

Witnesses:
R. M. ARMSTRONG,
L. M. CROOKER.